US006532673B2

(12) United States Patent
Jahn et al.

(10) Patent No.: US 6,532,673 B2
(45) Date of Patent: Mar. 18, 2003

(54) METHOD AND DEVICE FOR AUTOMATICALLY ADJUSTING THE AXLE GEOMETRY OF A SUSPENDED VEHICLE IN A PRODUCTION LINE

(75) Inventors: Lars Jahn, Nuremberg (DE); Frank Schneider, Nuremberg (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/966,107

(22) Filed: Oct. 1, 2001

(65) Prior Publication Data
US 2002/0040533 A1 Apr. 11, 2002

Related U.S. Application Data

(63) Continuation of application No. PCT/DE00/00956, filed on Mar. 29, 2000.

(30) Foreign Application Priority Data

Mar. 30, 1999 (DE) ......................................... 199 14 328

(51) Int. Cl.⁷ .............................................. G01B 11/26
(52) U.S. Cl. ............................. 33/193; 33/645; 33/286
(58) Field of Search ...................... 33/193, 203, 203.12, 33/203.13, 203.15, 203.18, 203.19, 203.2, 286, 288, 600, 645; 414/749.1, 678

(56) References Cited

U.S. PATENT DOCUMENTS

| | | | | |
|---|---|---|---|---|
| 4,106,208 A | * | 8/1978 | Hunter ..................... 33/203.18 |
| 4,598,481 A | * | 7/1986 | Donahue ..................... 33/600 |
| 4,630,379 A | * | 12/1986 | Wickmann et al. ........... 33/288 |
| 4,663,855 A | * | 5/1987 | Hamilton et al. ............. 33/288 |
| 4,679,327 A | * | 7/1987 | Fouchey et al. .......... 33/203.13 |
| 4,854,702 A | * | 8/1989 | Stieff ........................... 33/288 |
| 4,885,846 A | * | 12/1989 | Nemeth et al. .......... 33/203.13 |
| RE33,144 E | * | 1/1990 | Hunter et al. ................. 33/288 |
| 4,899,218 A | * | 2/1990 | Waldecker et al. ............ 29/273 |
| 5,027,275 A | | 6/1991 | Sakamoto et al. ...... 364/424.05 |
| 5,040,303 A | | 8/1991 | Koerner ....................... 33/286 |
| 5,313,711 A | * | 5/1994 | Kling et al. .............. 33/203.18 |
| 5,488,472 A | * | 1/1996 | January ........................ 33/288 |
| 5,636,016 A | | 6/1997 | Coetsier et al. ........... 33/203.18 |
| 5,731,870 A | | 3/1998 | Bartko et al. ........... 356/139.09 |
| 6,400,451 B1 | * | 6/2002 | Fukuda et al. ........... 33/203.18 |
| 6,404,486 B1 | * | 6/2002 | Nobis et al. .............. 33/203.18 |
| 6,412,183 B1 | * | 7/2002 | Uno ....................... 33/203.12 |

FOREIGN PATENT DOCUMENTS

| | | |
|---|---|---|
| DE | 196 36 427 | 7/1997 |
| EP | 0 679 865 | 11/1995 |
| FR | 2 677 445 | 12/1992 |
| FR | 2 769 704 | 4/1999 |
| JP | 101 57 653 A | 6/1998 |

* cited by examiner

Primary Examiner—G. Bradley Bennett
(74) Attorney, Agent, or Firm—Sughrue Mion, PLLC

(57) ABSTRACT

A method and a device to adjust the axle geometry of a vehicle (1), wherein measurement values are taken into account, which are automatically detected at the wheels that are arranged at a fully assembled chassis (14) of the vehicle (1). Advantageously, the chassis (14) is moved to an empty-weight position and at least one of the wheels is rotated. Preferably, an additional measurement value, which represents an inclination of the steering wheel (18) of the vehicle (1) is detected and taken into account. Advantageously, the adjusting device for adjusting the axle geometry is integrated into an assembly line after assembly devices that serve to at least assemble the chassis (14) and the wheels of the vehicle (1).

46 Claims, 3 Drawing Sheets

METHOD AND DEVICE FOR AUTOMATICALLY ADJUSTING THE AXLE GEOMETRY OF A SUSPENDED VEHICLE IN A PRODUCTION LINE

This is a Continuation of International Application PCT/DE00/00956, with an international filing date of Mar. 29, 2000, which was published under PCT Article 21(2) in German, and the complete disclosure of which, including amendments, is incorporated into this application by reference.

FIELD OF AND BACKGROUND OF THE INVENTION

The invention relates to a method for adjusting the axle geometry of a vehicle and to an adjusting device that adjusts the axle geometry of a vehicle. Furthermore, the invention relates to an assembly line for vehicles, which includes assembly installations and an adjusting device for adjusting the axle geometry according to the present invention.

Typically, in conventional assembly plants, the axle geometry of a vehicle is manually adjusted after completion of the assembly process. At this point, the vehicle has left the area of the assembly installations and the vehicles are manually transported to an area, which includes, if necessary, several parallel stations for adjusting the axle geometry. These stations may have pits in which mechanics are working. The vehicles are placed over these pits. The chassis of the vehicles can then be adjusted by the personnel in a shop-like manner.

U.S. Pat. No. 5,040,303 discloses a method and a device for adjusting the axles of a vehicle. This device includes an automatic adjusting station that is arranged in a pit. To adjust the vehicle axles, the vehicle must be placed over the adjusting station, for instance by a person, and at least by means of the vehicle's own chassis. The adjusting station is configured in such a way that adjustments are performed on vehicles that have a so-called "set" chassis. In these vehicles, at least the full vehicle weight has already acted on the chassis over a prolonged period of time, so that stresses of various kinds have already partly subsided.

U.S. Pat. No. 5,027,275 also discloses a method and a device for adjusting the axles of a vehicle. This device includes an automatic adjusting station that is arranged in a pit. To adjust the vehicle axles, the vehicle must be placed over the adjusting station, for instance by a person, and at least by means of the vehicle's own chassis. Again, the adjusting station is configured in such a way that adjustments can be performed on vehicles that have a "set" chassis. In addition, a possible inclination of the steering wheel is detected by means of a steering wheel measuring balance and is taken into account in the axle adjustment.

German laid-open patent application DE 196 36 427 A1 discloses a method and a device for measuring and adjusting the axle geometry of a vehicle. This method assumes that the front and rear axles are pre-assembled in separate assembly areas. Simultaneously to the pre-assembly, the axle geometry is adjusted in that the positions of the axles are detected with respect to a relative coordinate system. This relative coordinate system is based on locking pins in the vehicle floor, for example. Subsequent positions of the wheels of the vehicle can be determined via the position of the brake disks in the relative coordinate system. The thus pre-assembled and adjusted axles are then mounted to the floor of the vehicle.

U.S. Pat. No. 5,731,870 discloses a method and a device for optically measuring the track and inclination values at the vehicle wheels. To this end, the vehicle is placed into a measuring station by means of its own chassis. Here, too, the adjusting station is configured in such a way that the adjustments are made on vehicles that have a "set" chassis.

Finally, Japanese Patent JP 10 15 76 53 discloses a method for adjusting the axle geometry of vehicles in a vehicle production plant. The axle geometry values of the vehicles are detected and adjusted downstream from the assembly installations where the vehicles are produced. Again, the vehicles are transported to the measuring and adjusting stations by means of their own chassis. Here, too, the adjusting station is configured in such a way that the adjustments are made on vehicles whose chassis have "set".

It is one drawback of these prior art devices that each vehicle must be individually and manually transported to the test stands used for chassis adjustment, which is time consuming and costly. Particularly in the case of a production plant or assembly line for automotive vehicles, this impairs the rapid production flow in such a way that the chassis geometry has to be adjusted in so-called rework stations. These are workstations that are equipped and organized like shops, in which the newly produced vehicles must be manually adjusted outside the assembly installations, which are typically automated.

A further significant drawback is that the vehicles have already been set on their wheels prior to being transported to the measuring device. To reach an approximately stationary, i.e., a "set" state, a certain settling behavior has to be awaited first. During this process, all movable and spring-action components of a chassis settle while various stresses are reduced. This is no problem in vehicles that are already in use, since the settling of the chassis can be considered complete because of use. In contrast, after a new vehicle produced in an assembly plant is first set down, one has to wait for a certain settling behavior. This, too, can considerably interfere with the rapid and, in particular, fully automated production flow in an automotive assembly plant or assembly line.

OBJECTS OF THE INVENTION

It is one object of the invention to provide a method for adjusting the axle geometry of a vehicle. It is a further object of the present invention that this method be automatically performed, for example with the aid of robots, in particular in fully automated production plants. A further object of the invention is to provide an adjusting device that is suitable for performing this method. It is another object of the invention to provide a production line or assembly line for vehicles, in which the assembly installations of the assembly line interact with the adjusting device according to the invention in a particularly advantageous manner.

SUMMARY OF THE INVENTION

According to one formulation of the invention, these and other objects are achieved by a method for adjusting an axle geometry of a vehicle, which is located in a suspended position after a manufacturing process of the vehicle, and which has a fully assembled chassis that includes at least a front axle and a rear axle. In a first step of the method according to the invention, measurement values are automatically detecting on wheels that are arranged at the chassis of the vehicle. Furthermore, the measurement values are analyzed to automatically correct the axle geometry of the vehicle.

The method is particularly suitable for vehicles that have not yet been set down onto a lane after completion of the production process. The adjustment according to the invention is done automatically by taking into account at least the measurement values that are detected on the wheels mounted to the chassis of the suspended vehicle.

Parameters that characterize the axle geometry of a vehicle include, in particular, the track and the inclination, but also the caster of the wheels of the vehicle. Therein, the wheels are rims that are fully equipped with tires.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

DETAILED DESCRIPTION OF THE PREFERRED EMBODIMENTS

According to the present invention, the axle geometry of the vehicle is adjusted during the vehicle production process. The vehicle that is being assembled is at least held in a suspended position with the aid of holding means. Advantageously, these holding means take the form of a suspension conveyor system, which is used not only to hold the vehicles but also to transport them into and out of the preferably fully automated production and adjusting installations.

Furthermore, according to the invention, the axle geometry of the vehicle is adjusted in a vehicle production area where the essential components of at least the vehicle chassis have already been fully assembled. The entire chassis of the vehicle, which includes at least the front and rear axles and the drive assembly of the vehicle have been fully assembled in respective assembly installations and assembly stations. Therein, if necessary, the drive assembly includes a cardan shaft. Moreover, all axles are completely equipped with wheels. In another preferred embodiment of the invention, it is advantageous if, in addition, at least the steering wheel is mounted in the cab.

If appropriate, other components in connection with the drive assembly, such as the exhaust system, heat shields and tanks of the vehicle, may also be pre-assembled in the relevant area of the production line or assembly line.

Figure 1:
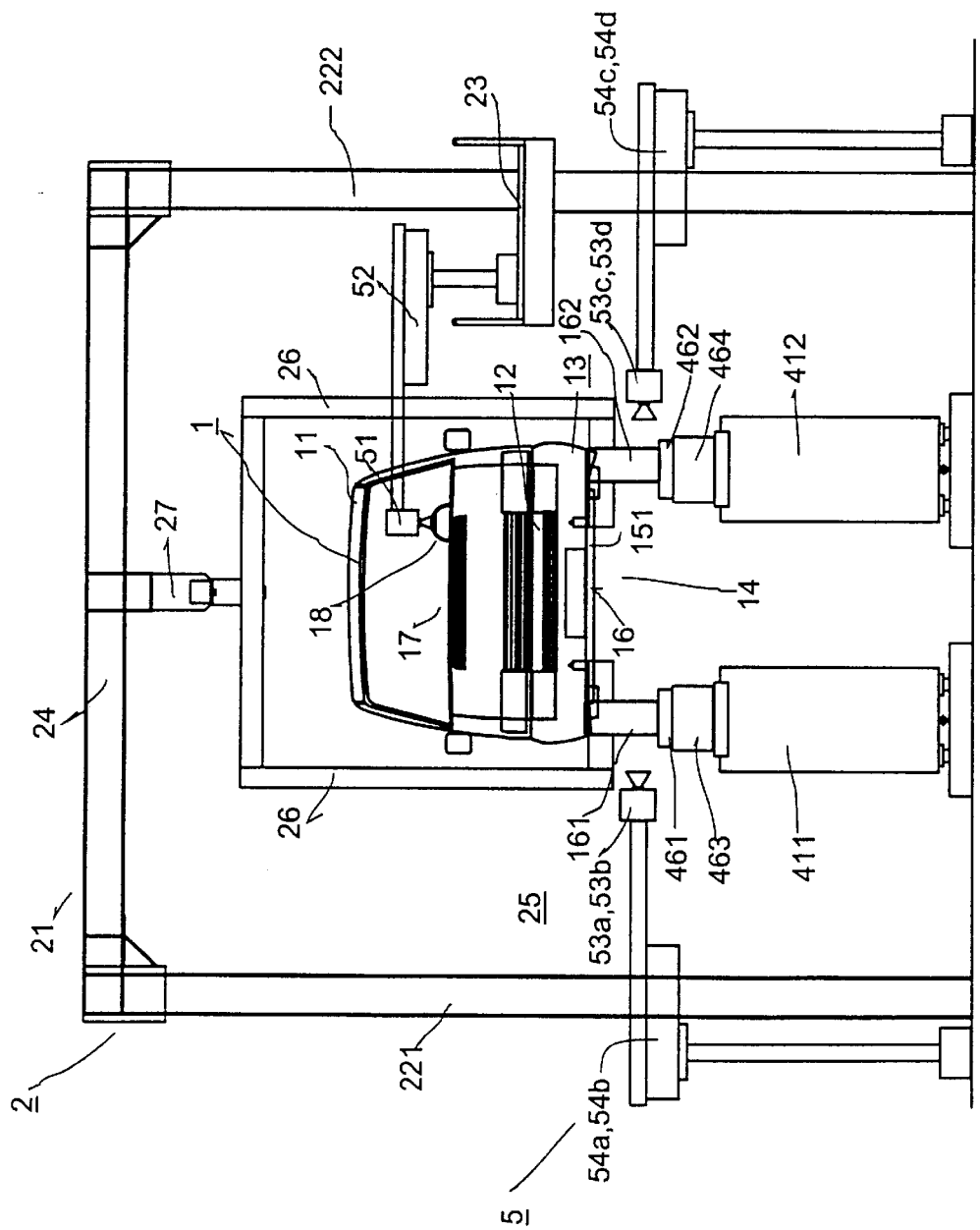
FIG. 1 is a front view of an advantageous embodiment of an adjusting device according to the invention.

By way of example, FIG. 1 shows a front view of a vehicle 1 in a certain assembly stage. At least with respect to the outer structure of the body 11, the vehicle 1 is nearly complete. With respect to the drive units 13, i.e., with respect to the chassis 14 and the drive assembly 12, the vehicle 1 is already fully assembled. With respect to the interior 17, the vehicle 1 may still be in its unfinished state. In addition, all the axles of the vehicle are already equipped with wheels, i.e. essentially ready for driving. FIG. 1 shows a front axle 151 including right wheel 161 and left wheel 162. According to an advantageous embodiment of the invention, the vehicle 1 shown in FIG. 1 is also equipped with at least a steering wheel 18 in the interior 17.

Advantageously, in the assembly line, the vehicle 1 is transported by means of a conveyor system, in particular by a suspension conveyor system 2. By way of example, FIG. 1 shows a front view of a single U-shaped and rack-like support unit 21 of this conveyor system 2, which includes a right support column 221, a left support column 222, and a cross member 24 extending across the top. Further, the suspension conveyor system 2 includes a plurality of support units arranged one behind the other, which form a conveyor tunnel 25. The vehicle 1 is held by a suspended rack 26, which engages with a vehicle floor 16, and is transported in suspended position through the transport tunnel 25 via a running rail 27 that is mounted to the cross member 24. In addition, a balcony-like platform 23, the function of which will be explained in greater detail below, is mounted to the support column 222.

In the exemplary embodiment shown in FIG. 1, the vehicle 1 has just been transported into an adjusting device for adjusting the axle geometry, which can also be designated as a chassis alignment station. The components of this station fully automatically engage with the vehicle from below i.e., particularly with the vehicle floor 16, the wheels 161, 162, and wheels 171, 172. This will be explained in greater detail below by means of FIGS. 2 and 3.

The adjusting device according to the invention may include data processing components, which, for the sake of clarity, are not depicted in FIG. 1. Preferably, these components are contactless components for identifying the individual vehicle unit that happens to be in the adjusting device. Such components may also be referred to as an identification system. The identification components may include processed data that is stored, for instance, in a mobile data memory, which is located on the vehicle 1 or on the suspension rack 26. This data may be detected and processed in a guidance system and displayed, for instance, on a display unit. This data may be necessary, for example, to provide the setpoint values required for automatically adjusting the axle geometry. The setpoint values may be subject to type-specific fluctuations. For example, the axle geometry of vehicles of same configuration may have to be adjusted differently, e.g., as a function of the different future use of the vehicle, such as transporting cargo or people, i.e., as a function of the future payload. In addition, different wheelbases and wheel sizes may require a corresponding adaptation of the adjustment values for the respective axle geometry.

Figure 2:
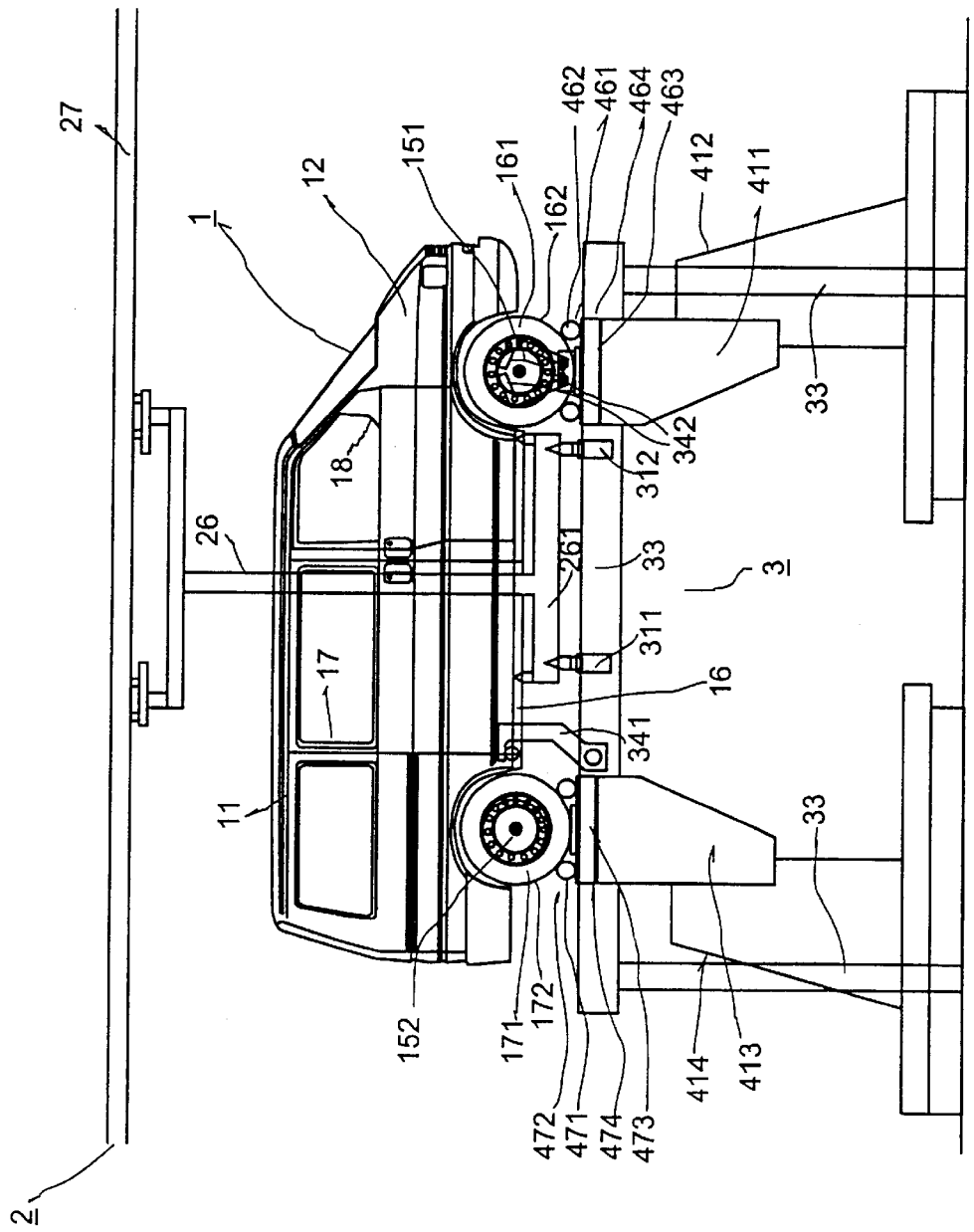
FIG. 2 is a side view of a first detail of the exemplary adjusting device according to FIG. 1.

FIG. 2 shows a side view of the exemplary adjusting device depicted in FIG. 1. Before the axle geometry can actually be adjusted, various preparations are necessary. These preparations include the following steps:

In a first step, the vehicle 1 and the components of the adjusting device according to the invention are mutually aligned and subsequently fixed, i.e., they are held in a rigid position. To this end, the adjusting device according to the invention is advantageously equipped with a centering device 3. In the exemplary embodiment shown in FIG. 2, this centering device 3 includes fixation pins 311, 312. These fixation pins 311, 312 approach the vehicle from below via a lifting unit 33 and engage either with a lower cross member 261 of the suspension device 26 that is located in the vehicle floor 16 or directly with the vehicle floor 16. A vehicle 1 is now precisely fixed in a certain position within the adjusting device according to the invention relative to the suspension conveyor system 2. Also, the vehicle 1 is mechanically secured. This process may also be referred to as "staking out."

In a second step, the body 11 must be secured to prevent the body 11 from being accidentally lifted out of the suspension device 26. In the exemplary embodiment of FIG. 2, hold-down devices are provided for this purpose, which are mounted, for instance, to the lifting unit 33. A first clamping device 341, which is, for example, of the bracket-type, engages with the vehicle floor 16 in an area of the rear axle 152. A second clamping device 342, which is, for example, of the clip-type, engages with the vehicle floor 16 in an area of the front axle 151.

Figure 3:
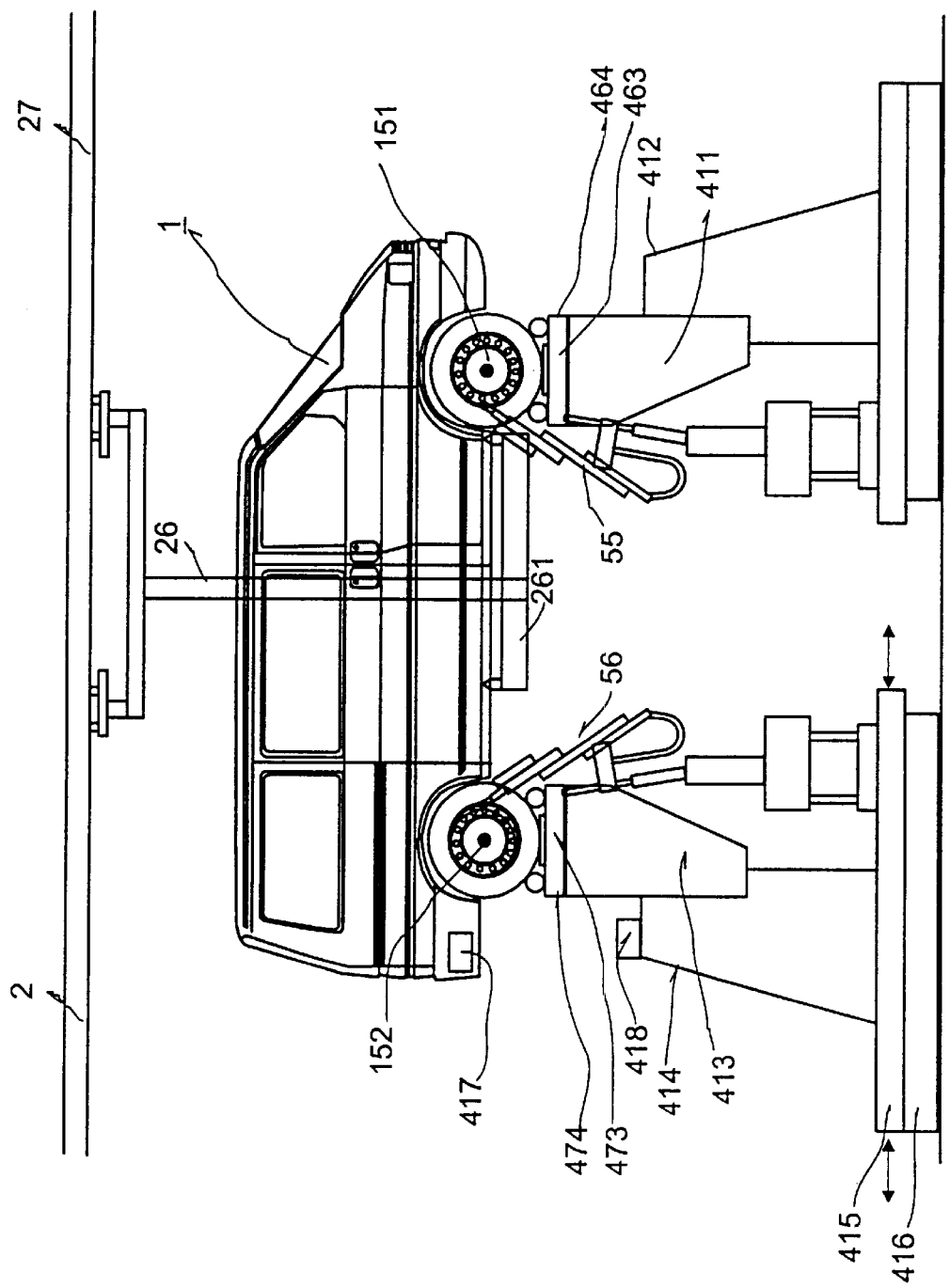
FIG. 3 is a side view of a second detail of the exemplary adjusting device according to FIGS. 1 and 2.

An additional preparation step may be provided to eliminate stresses that may be present in the chassis and that can be caused by the assembly of the vehicle 1. It is one of the advantages of this exemplary embodiment that the measurement values, which are required for the subsequent automatic adjustment of the axle geometry according to the invention, can be detected with greater accuracy. In order to provide this advantage, the exemplary embodiment depicted in FIGS. 1 to 3 is provided with track rollers 461, 462, 471, 472 for the wheels 161, 162 of the front axle 151 and the wheels 171, 172 of the rear axle 152 of the vehicle 1. These track rollers approach the vehicle wheels from below by means of lifting units 411, 412, 413, 414. The track rollers 461, 462, 471, 472 are mounted on floating plates 463, 464, 473, 474, which are freely movable at least in a horizontal direction.

By means of the lifting units 411, 412, 413, 414, these elements are raised from below against the wheels 161, 162, 171, 172. The raising movement against the wheels 161, 162, 171, 172 is so hard that the chassis, i.e., the axles and wheels of the vehicle, approximately reach a so-called "construction position." This process may also be referred to as "spring-deflection."

Advantageously, the lifting units subsequently lower the track rollers supported on the floating plates far enough so that an "empty weight Position" of the chassis, i.e., of the vehicle's axles and wheels, is approximately reached. This position approximately corresponds to a position of the axles and the wheels that would occur if the vehicle were placed onto a surface and would load the axles and wheels with its own weight, i.e., the empty weight.

It is advantageous if at least the measurement values that are required for automatically adjusting the axle geometry according to the invention are detected while the wheels and axles assume this "empty weight position."

Thus, in a particularly advantageous manner, the measurement values that are required to adjust the axle geometry are detected on the wheels, which are mounted to the fully assembled chassis of the vehicle and which are located in the "empty weight position." This results in particularly high measuring and adjustment accuracy since the wheels and, thereby, any dimensional tolerances connected therewith are included in the measurement. Further, the risk is eliminated that the adjustment of the axle geometry would be changed by some subsequent assembly step, e.g., tire mounting. Advantageously, the automatically detected measurement values are the track and inclination values on the front axle 151 and/or the rear axle 152.

In another particularly advantageous embodiment of the method according to the invention, the vehicle wheels, which are preferably in their empty weight position, are rotated for measurement purposes. Thus, the track and inclination values are preferably measured on rotating wheels. This makes it possible to detect other disturbance variables, in particular production-related imbalances on the wheels and the rims, and to compensate them when the axle geometry is adjusted.

In the preferred embodiment of FIG. 2, the wheels 161, 162, 171, 172 can be rotated by means of the track rollers 461, 462, 471, 472 and the floating plates 463, 464, 473, 474, which engage from below via the lifting units 411, 412, 413, 414. Preferably, the measurements are started only after a full rotation of the wheels.

To detect the measurement values, in particular the track and inclination values, a high point of a wheel is measured during at least one fill rotation. This is a point on the surface of a tire where the wheel has a maximum curvature. If a distance measuring device is used per wheel to detect the measurement values, then a high point is present when a minimum distance value is detected between the wheel and the distance measuring device. At least one such point is sought per rotation of a wheel. This point is used as a reference point for the further measurement of the axle geometry and for the measurement values characterizing the current adjustment of the axle geometry. It is particularly advantageous to detect the measurement values on the front and the rear axles in the form of a so-called multipoint measurements.

This can be described as follows. To determine the position of the rotational axis of a wheel and, thus, to determine its track and inclination angle, the plane, in which the wheel is rotating, is determined. This plane is perpendicular to the rotational axis of the wheel and can be measured by detecting at least three points in this plane, not all of which lie in a straight line. Advantageously, the measurement of these three points is carried out by optical triangulation. To this end, per measurement point, a laser beam is projected onto the tire wall. From a fixed angle, a video camera records the laser light, which is backscattered from the tire. An image processor uses the video image to determine the position of the light point on the tire and, thus, its coordinates in space. To increase the accuracy, a laser line may be used instead of a point-like laser beam. From the coordinates of the laser line, a fixed point is determined, which serves as the base point for determining the wheel plane. A laser, a video camera and an image processor can be placed in each individual distance sensor. These are the elements identified as 53a, 53b, 53c and 53d in FIG. 1. Preferably, in order to exclude errors due to unevenness in the tire wall, the values are measured on the rotating wheel and averaged over one full rotation. Since each unevenness of the tire wall passes each of the three sensors precisely once during one rotation of the wheel, each of the three mean values is equally influenced by each unevenness. Thus, the plane through these three mean values represents precisely the rotational axis of a wheel. From the rotational axes of all four wheels of a vehicle, the coordinates and the inclination angles of the wheels and, thus, the entire axle geometry can be calculated. Preferably, a target/actual comparison is then performed, so that, in case of any deviations, correction values can be derived.

In order to detect measurement values, the floating plates are released so as to float upon a contact with the respective wheel. During the spring deflection process and the measurement process, the configuration of the floating plates then causes the floating plates to transfer no other forces to the respective wheel than the simulated wheel contact force.

In a further embodiment of the method according to the invention, additional means are provided for automatically detecting a possible inclination of the steering wheel. This provides an additional measurement value that can be taken into account in the adjustment of the axle geometry. This makes it possible to compensate inclinations of the steering wheel, particularly when adjusting the track of the chassis. Also, this way, such inclinations at least do not cause any adjustment errors. Preferably, to measure the steering wheel position, an optical measuring device 51 is used (see FIG. 1). This measuring device 51 may be mounted to the cantilever of an automatic manipulator 52. In order to be able to perform the measuring process, the cantilever drives into the vehicle interior 17, e.g., through an open side window. In the exemplary embodiment of FIG. 2, the manipulator 52 is placed on the platform 2.

In a particularly advantageous embodiment of the invention, a detected inclination of the steering wheel is compensated by a preferably automatic action on the associated axle, for example. For example, automatic manipulators act on the steering tie rod of the vehicle until the inclination of the steering wheel is eliminated. For example, the optical measuring device 51 detects the change in position of the steering wheel that occurs due to rotation during such a correction and converts it into an additional measurement value. This measurement value can then be additionally taken into account during the automatic adjustment of the axle geometry.

Advantageously, the optical measuring device 51 of the adjusting device according to the invention is embodied in the form of a unit that automatically generates data, in particular digital picture data, of at least the steering wheel 18 of the vehicle 1. For example, the optical measuring device 51 is a digital video camera. This data is supplied to an evaluation unit (not depicted), e.g., a digital computer, which automatically generates a correction value from the picture data that represents a possible inclination of the steering wheel. This value, in turn, is taken into consideration in the automatic adjustment of the track and/or inclination of the chassis.

In practice, the measured values are advantageously the individual track values and the total track values, taking into account the rotating direction of the rear wheels. Furthermore, the measured values advantageously include the individual inclination values and the differences between the left and the right wheels of a respective axle. The so-called caster of the wheels may also be measured.

To measure these values, it is particularly advantageous to use at least one optical measuring system. A suitable optical measuring system is, for instance, a laser measuring device. Through distance measurements, the laser measuring device detects the fluctuations that occur during at least one rotation of a wheel. These fluctuations are used to determine the associated measurement values for the axle geometry to determine special correction values for the precise adjustment of the axle geometry.

The exemplary optical measuring system shown in FIG. 1 includes the laser measuring heads 53a and 53c, which are mounted to automatic manipulators 54a and 54c, respectively, and which are assigned to the left wheel 161 and the right wheel 162 on the front axle 151 of the vehicle 1, respectively. Corresponding elements may also be assigned to the wheels of the rear axle. In FIG. 1, these elements lie in a plane located behind the elements 53a, 54a and 53c, 54c. For example, the left wheel on the rear axle is associated with the laser measuring head 53b on the manipulator 54b, and the right wheel on the rear axle is associated with the laser measuring head 53d on the manipulator 54d. The measurement values that are thereby detected are supplied to an evaluation unit. In particular, this unit compares the measured track and inclination values with defined setpoints. Any deviations between the actual values and the setpoint values are used as adjustment values for a subsequent, preferably automatic adjustment.

The adjustment itself is performed on the wheels, which are, during the adjusting, in a stationary state. To this end, the adjusting device according to the invention has at least one automatic manipulator. In the exemplary embodiment of FIG. 3, separate manipulators 55, 56 are provided for the front axle 151 and the rear axles 152, respectively. The manipulators 55, 56 approach the respective adjustment points on the left and the right wheels of the respective axle. The track adjustment is automatically performed until the deviation of the respective actual value from the respective associated setpoint value falls within a defined tolerance.

After the adjustment is completed, locking means, which are located on the chassis of the vehicle 1, are advantageously automatically activated either by a different manipulator or preferably by the same manipulators 55, 56. These may be locking elements, particularly locknuts, that are already mounted to the steering tie rod. Advantageously, the manipulator automatically limits the forces to be applied to the chassis when the locking means are activated. In particular, the torques that are applied to the steering tie rod to activate the locking elements are limited.

After fixing the steering tie rod by a locknut, the adjustment of the axle geometry of the vehicle 1, which is located in the adjusting device, is complete. The adjusting device can now release the vehicle 1, which can then be conveyed onward via the suspension conveyor system 2. To this end, the floating plates 463, 464, 473, 474 are lowered via the respective lifting units 411, 412, 413, 414 and locked. The measuring device 5, i.e., in particular the optical measuring device 51 and the laser measuring heads 53 as well as the associated manipulators 52, 54, are retracted into their initial position. The suspension device 2 can now release the vehicle 1, which can then be transported to other assembly installations of the assembly line via the suspension rack 26 arranged at rails 27.

In another embodiment of the invention, the automatic adjusting device is furthermore equipped with an automatic traversing unit, at least for the lifting units. If necessary, automatic manipulators may also be positioned via the traversing unit. In particular, the traversing unit is used to automatically adapt at least the position of the lifting units to the current distance between the front and rear axles of the chassis of the vehicle, which is held and fixed by the suspension conveyor system and the centering device. Advantageously, at least one reading device is provided for at least one data carrier. The data carrier contains the current distance between the front and the rear axles of the vehicle that is currently located in the adjusting device. The reading device can read this value from the data carrier, and this value can be used to control the automatic traversing unit for the lifting units. Advantageously, the data carrier is mounted directly on the vehicle or on the suspension conveyor system 2.

In the exemplary embodiment of FIG. 3, such an automatic traversing unit 415 for the lifting unit 414 is provided under the right wheel of the rear axle 152 of vehicle 1. In particular, this makes it possible to automatically adjust the position of the lifting unit 414 to the current distance between the front axle 151 and the rear axle 152 of the chassis 14 of the vehicle 1, which is held and fixed by the suspension conveyor system 2 and the centering device 3. The traversing unit 415 is supported on a platform 416 and, in the exemplary embodiment of FIG. 3, additionally carries an automatic manipulator 56, which serves to adjust the axle geometry on the rear axle 152. Advantageously, at least one lifting unit, which acts on the left rear wheel (not shown in FIG. 3), is likewise supported via an additional automatic traversing unit.

Advantageously, the adjusting device has at least one reading device 418, which is mounted to the lifting unit 413 for the rear axle 152, for example. Preferably, this reading device 418 reads out the content of data carriers 417 in contactless manner, in which the current distance between the front axle 151 and the rear axle 152 of the chassis 14 of the vehicle 1 is stored. In the exemplary embodiment of FIG. 3, the data carrier 417 is mounted at the vehicle 1.

The automatic traversing unit has the particular advantage that the position of the lifting units particularly at the rear axle of the vehicle can be automatically adjusted to the current wheelbase.

Further, the device according to the invention for adjusting the axle geometry of a vehicle has the particular advantage that it can be integrated into a preferably fully automated assembly line for vehicles. Therein, the inventive device for adjusting the axle geometry of the vehicle is integrated downstream from the assembly installations that serve to mount at least the chassis and the wheels of the vehicle. Advantageously, the automatic adjusting device is integrated downstream from the assembly installations that serve to mount the steering wheel of the vehicle. There, the steering wheel may also be manually mounted.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for adjusting an axle geometry of a vehicle that is located in a suspended position after a manufacturing process of the vehicle and that has a fully assembled chassis comprising at least a front axle and a rear axle, the method comprising:
   automatically detecting measurement values on wheels that are arranged at the chassis of the vehicle; and
   automatically correcting the axle geometry of the vehicle utilizing the detected measurement values;
   wherein the vehicle is located in the suspended position during said automatically detecting step and during said automatically correcting step.

2. The method as claimed in claim 1, further comprising:
   holding the vehicle down;
   applying an external counter-force on the chassis of the vehicle; and
   allowing the chassis of the vehicle to spring-deflect to an approximately empty-weight position.

3. The method as claimed in claim 2, wherein the counter-force acts on the chassis via the wheels of the vehicle.

4. The method as claimed in claim 1, further comprising:
   holding the vehicle down;
   applying an external counter-force on the chassis of the vehicle;
   allowing the chassis of the vehicle to spring-deflect to approximately a construction position by means of the external counter-force; and
   wherein the chassis of the vehicle is subsequently lowered to an empty weight position.

5. The method as claimed in claim 4, wherein the external counter-force acts on the chassis via the wheels of the vehicle.

6. The method as claimed in claim 1, wherein the measurement values are selected from the group consisting of track values and inclination values of at least one of the front axle and the rear axle of the vehicle.

7. The method as claimed in claim 1, wherein the detecting step comprises:
   rotating at least one of the wheels of the vehicle; and
   detecting the measurement values at the rotating wheel.

8. The method as claimed in claim 1, wherein, in the detecting step, at least one high point of a respective one of the wheels is detected as a reference point during at least one full rotation of the respective wheel.

9. The method as claimed in claim 1,
   wherein, in the detecting step, at least one additional measurement value is automatically detected that represents a characteristic measure for an inclination of a steering wheel of the vehicle; and
   wherein, in the correcting step, the additional measurement value is taken into account to adjust the axle geometry of the vehicle.

10. The method as claimed in claim 9, wherein the at least one additional measurement value is optically detected.

11. The method as claimed in claim 1, further comprising:
    automatically correcting an inclination of a steering wheel of the vehicle; and
    wherein a characteristic measurement value for an original inclination of the steering wheel is derived from at least one positional change that is detected when the inclination of the steering wheel is corrected.

12. An adjusting device for adjusting an axle geometry of a vehicle, comprising:
    a support assembly supporting the vehicle in a suspended position;
    at least one measuring device automatically detecting measurement values on at least one wheel of the vehicle, wherein the vehicle has a fully assembled chassis; and
    at least one correcting device automatically adjusting the axle geometry of the vehicle in accordance with the detected measurement values.

13. The adjusting device as claimed in claim 12, wherein the measuring device comprises an optical measurement system.

14. The adjusting device as claimed in claim 13, wherein the optical measurement system comprises a laser measurement head.

15. The adjusting device as claimed in claim 12, wherein the correcting device comprises:
    a first automatic manipulator that is assigned to at least one of the wheel and an axle of the vehicle for adjusting the axle geometry of the vehicle.

16. The adjusting device as claimed in claim 15, wherein the first automatic manipulator is configured to manipulate components at the chassis of the vehicle that are designed to adjust at least one of track values and inclination values on at least one of a front axle and a rear axle of the vehicle.

17. The adjusting device as claimed in claim 12, further comprising a further measuring device automatically generating an additional measurement value that represents a characteristic measure for an inclination of a steering wheel of the vehicle.

18. The adjusting device as claimed in claim 17, wherein the further measuring device comprises an optical recording unit.

19. The adjusting device as claimed in claim 18, further comprising a further correction device for automatically adjusting the inclination of the steering wheel, wherein the further measuring device is configured to derive a further measurement value, which represents an original inclination of the steering wheel, from at least one positional change that occurs when the inclination of the steering wheel is automatically corrected.

20. The adjusting device as claimed in claim 19, wherein the further measuring device derives the positional change from an angle of rotation of the steering wheel, which occurs when the inclination of the steering wheel is automatically corrected.

21. The adjusting device as claimed in claim 18, wherein the further measuring device comprises:

a unit for automatically generating picture data of at least the steering wheel of the vehicle; and an evaluation unit configured to generate the additional measurement value based on the picture data.

22. The adjusting device as claimed in claim 21, wherein the unit for automatically generating the picture data comprises a digital video camera.

23. The adjusting device as claimed in claim 17, further comprising a manipulator configured to automatically drive the further measuring device into an interior of the vehicle.

24. The adjusting device as claimed in claim 23, wherein the interior of the vehicle comprises a cab.

25. The adjusting device as claimed in claim 13, further comprising:

locking means arranged at the chassis of the vehicle; and a third manipulator configured to automatically activate the locking means.

26. The adjusting device as claimed in claim 25, wherein the locking means comprise locking elements that are arranged at steering tie rods of the vehicle.

27. The adjusting device as claimed in claim 25, wherein the third manipulator is configured to automatically limit forces to be applied when activating the locking means arranged at the chassis.

28. The adjusting device as claimed in claim 27, wherein the forces comprise torques to be applied when activating the locking elements at steering tie rods of the vehicle.

29. The adjusting device as claimed in claim 15, wherein the first manipulator automatically activates locking means arranged at the chassis of the vehicle.

30. The adjusting device as claimed in claim 29, wherein the locking means comprise locking elements that are arranged at steering tie rods of the vehicle.

31. The adjusting device as claimed in claim 29, wherein the first manipulator is configured to automatically limit forces to be applied when activating the locking means arranged at the chassis.

32. The adjusting device as claimed in claim 31, wherein the forces comprise torques to be applied when activating the locking elements at steering tie rods of the vehicle.

33. The adjusting device as claimed in claim 13, further comprising an automatic centering device, which aligns and fixes the vehicle in position for an automatic adjustment of the vehicle's axle geometry.

34. The adjusting device as claimed in claim 12, further comprising:

a device for holding down the suspended vehicle; and lifting units configured to engage, from below, with the chassis of the vehicle to produce an external counter-force.

35. The adjusting device of claim 34, wherein the lifting units are configured to engage, from below, with wheels of the vehicle to produce the external counter-force.

36. The adjusting device as claimed in claim 34, wherein the lifting units comprise roller tracks for wheels of the vehicle.

37. The adjusting device as claimed in claim 36, wherein the roller tracks drive the wheels of the vehicle.

38. The adjusting device as claimed in claim 36, wherein the roller tracks are supported on the lifting units via floating plates.

39. The adjusting device as claimed in claim 34, wherein the lifting units are configured to move the chassis of the vehicle into at least an empty-weight position.

40. The adjusting device as claimed in claim 34, further comprising an automatic traversing unit configured to automatically adapt the lifting units to a positioning of wheels arranged at the chassis of the vehicle.

41. The adjusting device as claimed in claim 34, further comprising an automatic traversing unit configured to automatically adapt the lifting units to a distance between a front axle and a rear axle of the chassis of the vehicle.

42. The adjusting device as claimed in claim 40, further comprising:

a data carrier; and at least one reading unit, which is configured to read out a current distance between the wheels or between a front axle and a rear axle of the chassis from the data carrier, and which is configured to thereby control the automatic traversing unit for the lifting units.

43. The adjusting device as claimed in claim 42, wherein the data carrier is directly mounted to the vehicle.

44. An assembly line for a vehicle, comprising:

a plurality of assembly installations;

an adjusting device for automatically adjusting an axle geometry of the vehicle, comprising:

a support assembly supporting the vehicle in a suspended position;

at least one measuring device automatically detecting measurement values on at least one wheel of the vehicle, wherein the vehicle has a fully assembled chassis;

at least one correcting device automatically adjusting the axle geometry of the vehicle in accordance with the detected measurement values; and a suspension conveyor system conveying the vehicle into the adjusting device and removing the vehicle from the adjusting device after completion of the automatic adjustment of the axle geometry.

45. The assembly line as claimed in claim 44, wherein the adjusting device is integrated into the assembly line downstream from the assembly installations that serve at least to mount the chassis and wheels of the vehicle.

46. The assembly line as claimed in claim 44, wherein the adjusting device automatically adjusting the axle geometry of the vehicle is integrated at least downstream from an assembly system that serves to mount a steering wheel of the vehicle.

* * * * *